(12) United States Patent
Tonegawa

(10) Patent No.: US 10,110,372 B2
(45) Date of Patent: Oct. 23, 2018

(54) COMMUNICATING APPARATUS, CONTROL METHOD THEREFOR, AND STORAGE MEDIUM STORING PROGRAM

(71) Applicant: CANON KABUSHIKI KAISHA, Tokyo (JP)

(72) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/641,560

(22) Filed: Mar. 9, 2015

(65) Prior Publication Data

US 2015/0270953 A1 Sep. 24, 2015

(30) Foreign Application Priority Data

Mar. 24, 2014 (JP) ................. 2014-060800

(51) Int. Cl.
*H04L 9/00* (2006.01)
*H04L 12/58* (2006.01)
(Continued)

(52) U.S. Cl.
CPC ............ *H04L 9/006* (2013.01); *H04L 9/0825* (2013.01); *H04L 51/00* (2013.01); *H04L 51/30* (2013.01);
(Continued)

(58) Field of Classification Search
CPC ..... H04L 9/08; H04L 9/28; H04L 9/32; H04L 9/006; H04L 9/00; H04L 9/30;
(Continued)

(56) References Cited

U.S. PATENT DOCUMENTS 7,003,667 B1 * 2/2006 Slick .................... G06F 21/608
380/243
7,293,171 B2 11/2007 Batthish et al.
(Continued)

FOREIGN PATENT DOCUMENTS

CN 1934819 A 3/2007
CN 101416458 A 4/2009
(Continued)

OTHER PUBLICATIONS

Barth et al., Correcting Privacy Violations in Blind-Carbon-Copy (BCC) Encrypted Email, 2005.*
(Continued)

*Primary Examiner* — Hadi S Armouche
*Assistant Examiner* — Huan V Doan
(74) *Attorney, Agent, or Firm* — Fitzpatrick, Cella, Harper & Scinto

(57) ABSTRACT

A communicating apparatus receives at least (i) email data which is encrypted by a content encryption key, (ii) the content encryption key which is encrypted by a public key of the communicating apparatus, and (iii) a public key certificate of the communicating apparatus. The communicating apparatus decrypts the encrypted content encryption key by a private key corresponding to the public key certificate of the communicating apparatus and decrypts the email data by the decrypted content encryption key. And the communicating apparatus prints at least the email data and the public key certificate of the communicating apparatus.

8 Claims, 11 Drawing Sheets

(51) Int. Cl.
*H04L 29/06* (2006.01)
*H04L 9/08* (2006.01)

(52) U.S. Cl.
CPC ........ *H04L 63/045* (2013.01); *H04L 63/0823* (2013.01); *H04L 2209/60* (2013.01); *H04L 2463/062* (2013.01)

(58) Field of Classification Search
CPC ............... H04L 63/0823; H04L 9/0825; H04L 2463/062; H04L 63/045; H04L 51/00
See application file for complete search history.

(56) References Cited

U.S. PATENT DOCUMENTS

| | | | | |
|---|---|---|---|---|
| 2003/0105963 A1* | 6/2003 | Slick | .................... | G06F 21/608 713/171 |
| 2004/0109568 A1* | 6/2004 | Slick | .................... | G06F 21/608 380/277 |
| 2005/0038754 A1* | 2/2005 | Geist | .................... | G06Q 20/042 705/64 |
| 2005/0160292 A1* | 7/2005 | Batthish | ................. | H04L 12/58 726/5 |
| 2005/0172118 A1* | 8/2005 | Nasu | ....................... | G03G 21/04 713/156 |
| 2005/0204164 A1* | 9/2005 | Kakii | .................... | H04L 9/3268 726/5 |
| 2005/0228986 A1* | 10/2005 | Fukasawa | ............. | H04L 9/3263 713/156 |
| 2005/0289346 A1* | 12/2005 | Minagawa | ............ | G06F 21/608 713/171 |
| 2006/0265590 A1* | 11/2006 | DeYoung | .............. | H04L 9/3247 713/176 |
| 2006/0271787 A1* | 11/2006 | DeYoung | .............. | H04L 9/3281 713/176 |
| 2007/0180273 A1* | 8/2007 | Dohi | ...................... | G06F 21/608 713/193 |
| 2009/0201526 A1* | 8/2009 | Kikuyama | ............ | G06F 21/608 358/1.14 |
| 2010/0033771 A1* | 2/2010 | Terao | ................. | H04N 1/00846 358/474 |
| 2010/0250950 A1* | 9/2010 | Tsujimoto | ............. | H04L 12/585 713/176 |
| 2010/0306545 A1* | 12/2010 | Seki | ...................... | G06Q 10/107 713/175 |
| 2012/0260097 A1* | 10/2012 | Adams | .................. | H04L 63/123 713/176 |
| 2013/0290715 A1* | 10/2013 | Grohs | .................... | G06Q 10/06 713/168 |
| 2014/0177007 A1* | 6/2014 | Ganesan | ................. | G06F 21/84 358/3.28 |

FOREIGN PATENT DOCUMENTS

| | | |
|---|---|---|
| EP | 1091285 A3 | 1/2006 |
| JP | 2005223891 A | 8/2005 |

OTHER PUBLICATIONS

HP, How to Utilize the Networking Infrastructure to Protect HP Printing and Imaging Devices (Year: 2007).*
Network Working Group, S/MIME Version 2 Certificate Handling, 20 pages (Year: 1998).*
HP, Multifunction Peripheral (MFP) Security for Enterprise Environments, 10 pages (Year: 2004).*
Chinese Office Action issued in corresponding Chinese Application No. 201510113978.3 dated Jul. 3, 2017.
Chinese Office Action issued in corresponding Chinese Application No. 201510113978.3 dated Dec. 15, 2017.

* cited by examiner

FIG. 5

300
- From: sales@xyz.co.jp
- To: ifax@abc.co.jp
- Subject: SENDING BILL
- Date: Sat, 29 May 2010 13:21:23 +0900
- Message-Id: <20131019184552.BED2.1342DF07@xyz.co.jp>

301
TO ABC CO.

THANK YOU FOR YOUR CONTINUOUS SUPPORT.
I WILL SEND A BILL.

302
■ SIGNATURE OF SENDER
| | |
|---|---|
| VERSION | V3 |
| SERIAL NUMBER | 01 |
| SIGNATURE ALGORITHM | sha1RSA |
| ISSUER | admin@xyz.co.jp |
| START OF VALIDITY PERIOD | 2004/01/01 |
| END OF VALIDITY PERIOD | 2020/12/31 |
| SUBJECT | ifax@abc.co.jp  Nippon Co. Ltd.  RC-5000  A00011 |
| SEALING ALGORITHM | sha1 |

303
■ SIGNATURE OF RECIPIENT
| | |
|---|---|
| VERSION | V3 |
| SERIAL NUMBER | 01 |
| SIGNATURE ALGORITHM | sha1RSA |
| ISSUER | admin@abc.co.jp |
| START OF VALIDITY PERIOD | 2010/01/01 |
| END OF VALIDITY PERIOD | 2019/12/31 |
| SUBJECT | ifax@abc.co.jp  Nippon Co. Ltd.  RC-5000  A00020 |
| SEALING ALGORITHM | sha1 |

FIG. 8
| PAGE COUNT | IMAGE 610 | ATTRIBUTE 611 | RELATED FILE 612 |
|---|---|---|---|
| 1P |  | TIFF-TEXT |  |
| 2P | 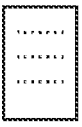 | TIFF | |
| 3P |  | TIFF | |
| 4P |  | TIFF | |
| 5P | | | |

FIG. 9

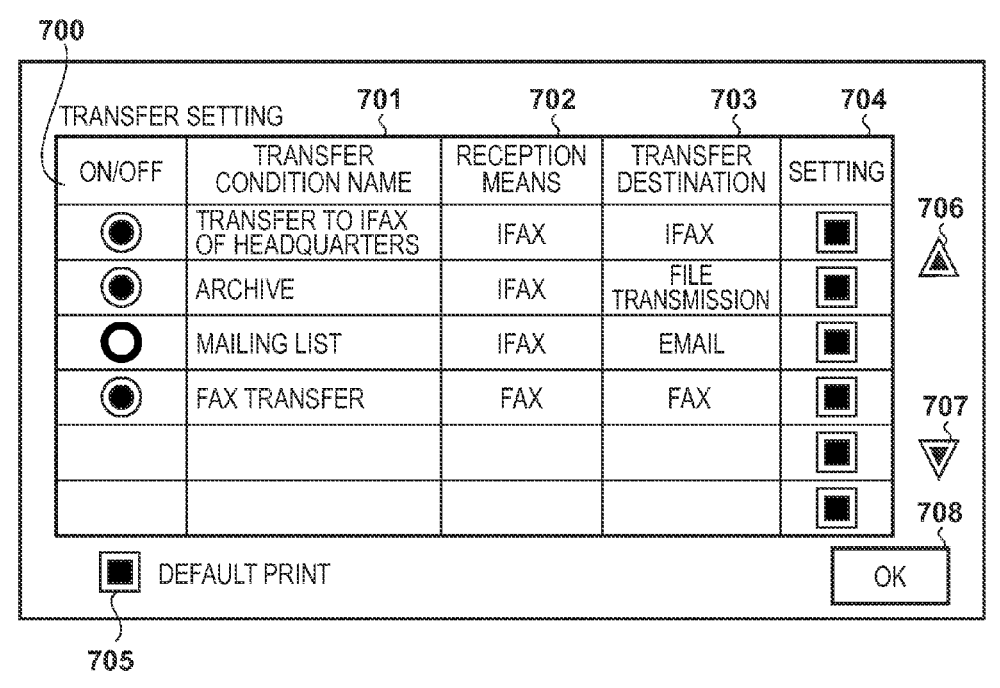

| ON/OFF | TRANSFER CONDITION NAME | RECEPTION MEANS | TRANSFER DESTINATION | SETTING |
|---|---|---|---|---|
| ● | TRANSFER TO IFAX OF HEADQUARTERS | IFAX | IFAX | ■ |
| ● | ARCHIVE | IFAX | FILE TRANSMISSION | ■ |
| ○ | MAILING LIST | IFAX | EMAIL | ■ |
| ● | FAX TRANSFER | FAX | FAX | ■ |
|  |  |  |  | ■ |
|  |  |  |  | ■ |

■ DEFAULT PRINT

OK

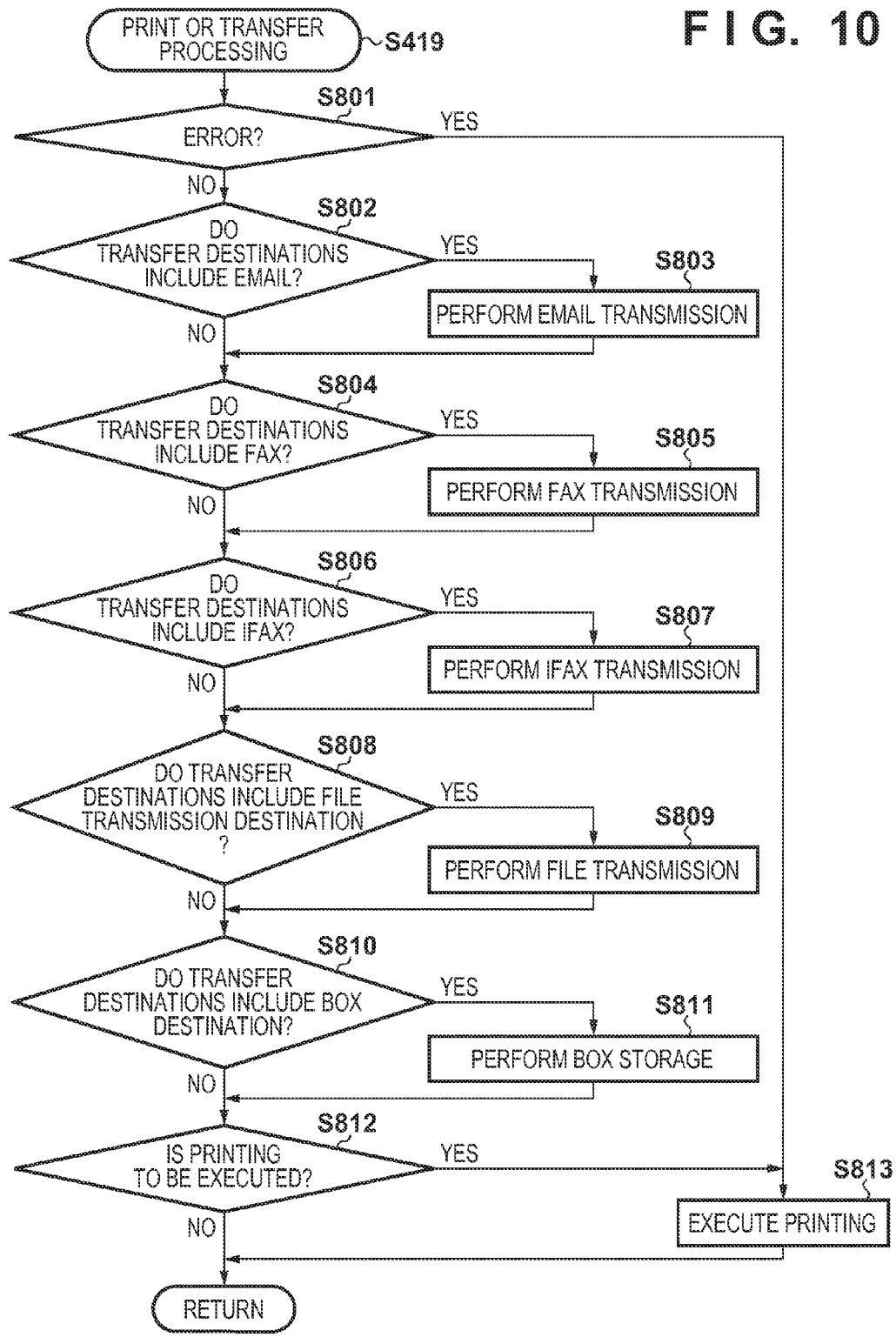

FIG. 11

850
```
From: ifax@abc.co.jp
To: tanaka@abc.co.jp
Message-Id: <20131019184552.8A87.1FF80BA9@abc.co.jp>
MIME-Version: 1.0
Content-Type: text/plain; charset="ISO-2022-JP"
Content-Transfer-Encoding: 7bit
Subject: Attached Image
```

851
```
--
From: sales@xyz.co.jp
To: ifax@abc.co.jp
Subject: SENDING BILL
Date: Sat, 29 May 2010 13:21:23 +0900
Message-Id: <20131019184552.BED2.1342DF07@xyz.co.jp>

TO ABC CO.

THANK YOU FOR YOUR CONTINUOUS SUPPORT.
I WILL SEND A BILL.

■ SIGNATURE OF SENDER
VERSION                    V3
SERIAL NUMBER              01
SIGNATURE ALGORITHM        sha1RSA
ISSUER                     admin@xyz.co.jp
START OF VALIDITY PERIOD   2004/01/01
END OF VALIDITY PERIOD     2020/12/31
SUBJECT                    ifax@abc.co.jp  Nippon Co. Ltd.  RC-5000  A00011
SEALING ALGORITHM          sha1

■ SIGNATURE OF RECIPIENT
VERSION                    V3
SERIAL NUMBER              01
SIGNATURE ALGORITHM        sha1RSA
ISSUER                     admin@abc.co.jp
START OF VALIDITY PERIOD   2010/01/01
END OF VALIDITY PERIOD     2019/12/31
SUBJECT                    ifax@abc.co.jp  Nippon Co. Ltd.  RC-5000  A00020
SEALING ALGORITHM          sha1
```

COMMUNICATING APPARATUS, CONTROL METHOD THEREFOR, AND STORAGE MEDIUM STORING PROGRAM

BACKGROUND OF THE INVENTION

Field of the Invention

The present invention relates to a communicating apparatus, a control method therefor, and a storage medium storing program.

Description of the Related Art

There exists S/MIME (Secure/Multipurpose Internet Mail Extensions) defined by RFC 2311 as a technique of enhancing the security of email, which can implement encryption of email data. If data is transmitted to a plurality of destinations including a Bcc address using S/MIME, the existence of the Bcc address is unwantedly indicated by the attached public key certificates of the transmission destinations. To solve this problem, U.S. Pat. No. 7,293,171 describes a technique of separately transmitting data to a Bcc address and other destinations.

An Internet FAX (IFAX) which transmits email attached with an image scanned by an MFP (Multi Function Peripheral) to a transmission destination and prints a received attached image file has become widespread. In the IFAX, in general, if a mail body and an attached image file are printed, the mail data is deleted from the apparatus and does not remain in the apparatus.

Therefore, a general user cannot determine whether the printed mail is mail with high security which is attached with a digital signature and has undergone encryption processing and certificate verification or mail which may include a false destination and altered data.

SUMMARY OF THE INVENTION

An aspect of the present invention is to eliminate the above-mentioned problems with the conventional technology.

The present invention provides a communicating apparatus of preventing information about transmission destinations other than a self apparatus from being printed even if encrypted email data is broadcast to a plurality of destinations, a control method therefor, and a storage medium storing program.

The present invention in one aspect provides a communicating apparatus comprising: a reception unit configured to receive at least (i) email data which is encrypted by a content encryption key, (ii) the content encryption key which is encrypted by a public key of the communicating apparatus, and (iii) a public key certificate of the communicating apparatus; a decryption unit configured to decrypt the encrypted content encryption key by a private key corresponding to the public key certificate of the communicating apparatus and then decrypt the email data by the decrypted content encryption key; and a print unit configured to print at least the email data decrypted by the decryption unit and the public key certificate of the communicating apparatus.

According to the present invention, even if encrypted email data is broadcast to a plurality of destinations, it is possible to prevent the inclusion of a Bcc address as a destination from being revealed by not printing information about transmission destinations other than a self apparatus.

Further features of the present invention will become apparent from the following description of exemplary embodiments with reference to the attached drawings.

BRIEF DESCRIPTION OF THE DRAWINGS

FIG. 5 is a view showing an example of the mail body image of the first page of the mail data shown in FIG. 3D, which has been encrypted using S/MIME and received and printed by the MFP;

FIG. 8 is a view showing document management data managed by the MFP;

FIG. 9 is a view showing an example of a screen for making transfer settings, which is displayed on the operation unit of the MFP;

FIG. 10 is a flowchart illustrating print or transfer processing in step S419; and FIG. 11 is a view showing an example of the text data of a mail body transmitted from the MFP to an email transfer destination.

DESCRIPTION OF THE EMBODIMENTS

Figure 1:
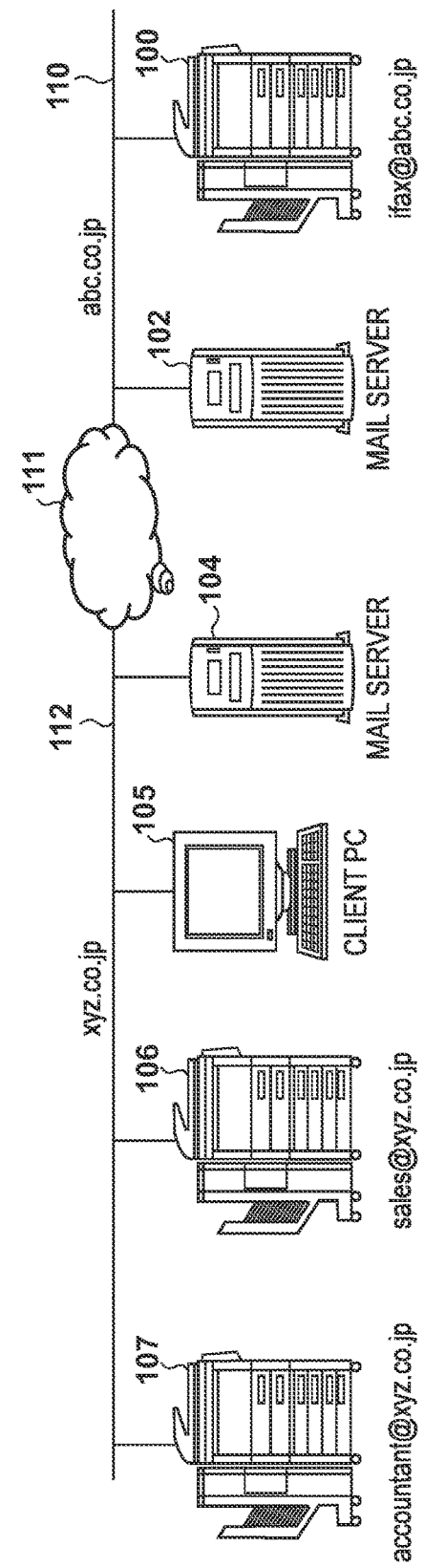
FIG. 1 is a view for explaining the configuration of a communication system including communicating apparatuses.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same components and a description thereof will be omitted.

FIG. 1 is a view for explaining the configuration of a communication system including communicating apparatuses according to an embodiment of the present invention. In this embodiment, an MFP (Multi Function Peripheral) will be exemplified as the communicating apparatus according to the present invention.

An MFP (Multi Function Peripheral) 100 has a copy function adopting an electrophotographic method, a FAX function, a printer function, and the like, and is connected to a network 110. The MFP 100 also has a SEND function of transmitting an image file read by a scanner to a computer apparatus, and an IFAX function of communicating image data obtained by reading by the scanner between apparatuses of the same type, and printing the received image data.

The network 110 has a domain name "abc.co.jp". A mail server 102 is also connected to the network 110. The mail server 102 can communicate with the MFP 100 by SMTP and POP3 protocols to deliver mail data attached with an image file. The network 110 is connected to the Internet 111, thereby connecting to networks across the world.

A network 112 is connected to a mail server 104, a client PC 105, and MFPs 106 and 107, has a domain name "xyz.co.jp", and is also connected to the Internet 111. The mail server 104 is a mail server which processes the SMTP and POP3 protocols, and can communicate with the mail server 102 via the Internet 111 by the SMTP protocol. Each of the MFPs 106 and 107 is a multi function peripheral having the copy, FAX, and printer functions, similarly to the MFP 100.

Image viewer software is installed in the client PC 105. This makes it possible to display image data obtained by scanning by the MFP 106 on the display unit of the client PC 105, and also print the image data by the MFP 107 using the printer function. Email client software is also installed in the client PC 105. The client PC 105 can transmit/receive email in cooperation with the mail server 104.

Figure 2:
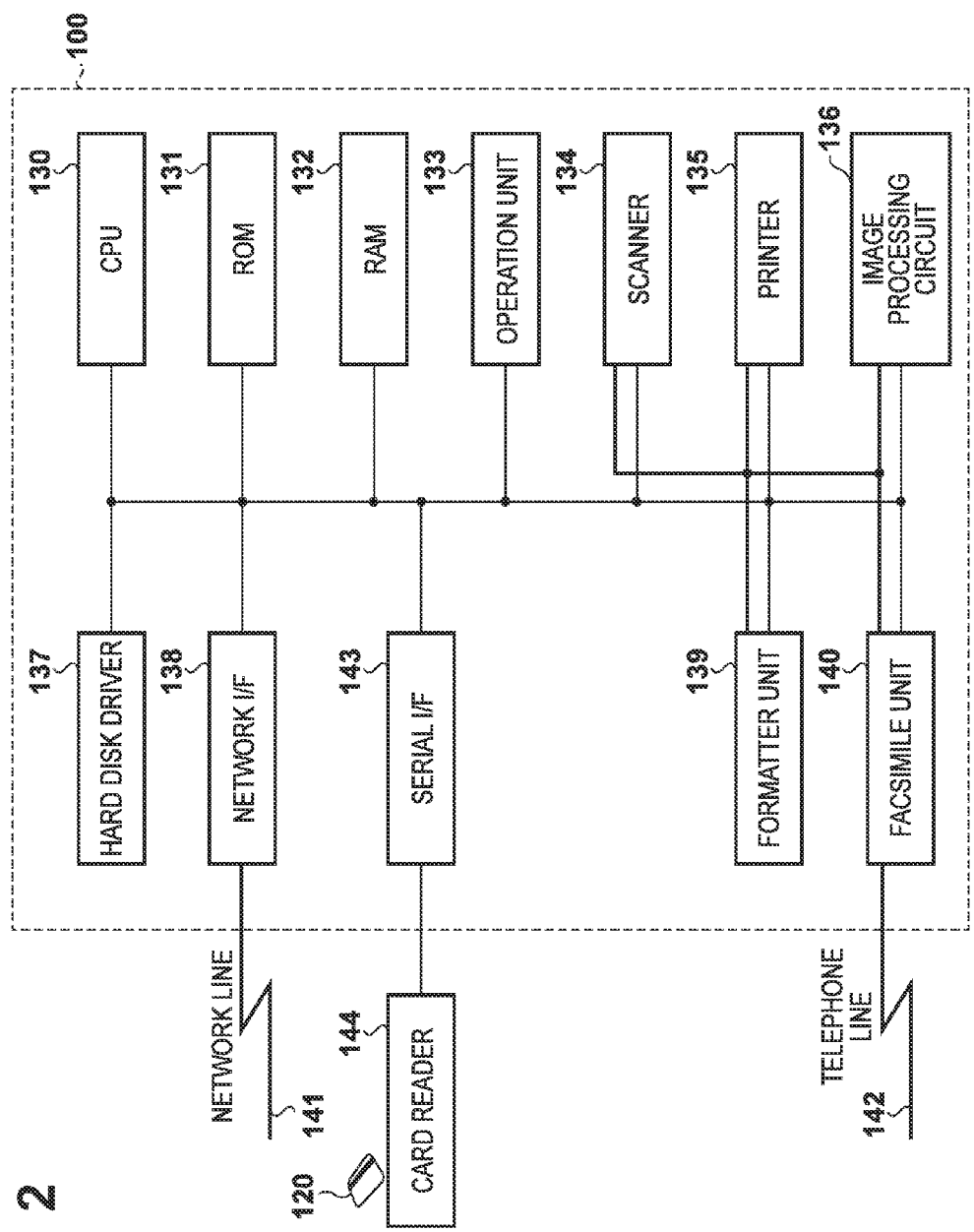
FIG. 2 is a block diagram showing the electrical arrangement of an MFP.

FIG. 2 is a block diagram for explaining the electrical arrangement of the MFP according to the embodiment. Note that the MFP 100 will be exemplified but the other MFPs 106 and 107 have the same arrangement.

Referring to FIG. 2, a CPU 130 controls the overall MFP using a RAM 132 and programs stored in a ROM 131. An operation unit 133 includes a display panel and hard keys such as a start key and ten-key pad, displays software buttons on the display panel, and can smoothly execute a user operation by detecting that a user touches a button by a finger. A scanner 134 generates image data by reading an image on a document. A printer 135 prints an image based on the image data on a printing medium.

An image processing circuit 136 includes a mass image memory, image rotating circuit, resolution scaling circuit, and encoding/decoding circuits of MH, MR, MMR, JBIG, JPEG, and the like. The image processing circuit 136 can also execute various image processes such as shading, trimming, and masking. A hard disk driver (HDD) 137 is a mass recording medium connected via an I/F such as SCSI or IDE. A network I/F 138 is a circuit represented by 10BASE-T or 100BASE-T which connects a network line 141 such as Ethernet® or token ring. Note that the network line 141 corresponds to the network 110 or 112 shown in FIG. 1. A formatter unit 139 is a rendering circuit which creates image data to be printed by the printer 135. Upon receiving a PDL (Page Description Language) data from the client PC 105 via the network I/F 138, the formatter unit 139 creates image data from the received PDL data. The created image data then undergoes image processing of the image processing circuit 136, and is printed by the printer 135.

The scanner 134, printer 135, image processing circuit 136, and formatter unit 139 are connected via a high-speed video bus different from the CPU bus of the CPU 130 so as to enable high-speed transfer of image data. The MFP 100 causes the image processing circuit 136 to perform image processing for image data obtained by the scanner 134, and causes the printer unit 135 to print an image based on the image data having undergone the image processing, thereby implementing the copy function. A facsimile unit 140 controls facsimile communication with an external apparatus on a telephone line 142. That is, image data read by the scanner 134 undergoes image processing of the image processing circuit 136, and is transmitted to an external apparatus via the telephone line 142. Alternatively, data is received from an external apparatus, undergoes image processing of the image processing circuit 136, and is then printed by the printer 135. The MFP 100 also has a BOX function of causing the image processing circuit 136 to create image data such as JPEG, PDF, or TIFF data based on image data obtained by reading by the scanner 134, and storing the created image data in the HDD 137.

The SEND function transmits created PDF image data via the network I/F 138 according to a communication protocol such as the SMTP, FTP, or SMB protocol. The SEND function is categorized into file transmission, email transmission, Internet facsimile (IFAX) transmission, or FAX transmission. A function of transmitting an image file such as a JPEG, PDF, or TIFF file by the SMTP protocol will be referred to as email transmission, and a function of transmitting an image file by a transmission protocol such as the FTP, SMB, or WebDAV protocol will be referred to as file transmission. IFAX transmission implements the facsimile function defined by RFC 2305 by transmitting/receiving email attached with an image file between apparatuses of the same type. In IFAX transmission, the image processing circuit 136 creates a TIFF file defined by RFC 3949 based on image data obtained by the scanner 134, thereby transmitting the created TIFF file using the SMTP protocol. Also, email attached with a TIFF file is received using an SMTP or POP3 function, and the TIFF file is converted into an internal image format image using the image processing circuit 136, and printed by the printer 135. In FAX transmission, the facsimile unit 140 is used to connect to the telephone line 142, thereby performing G3 FAX transmission.

A serial I/F 143 is a serial I/F such as RS232C, and is an I/F for connecting an external serial apparatus to the MFP 100. A card reader 144 is connected to the serial I/F 143, and can read out information recorded in a card 120. The card 120 is distributed to each user of the MFP 100, and the card reader 144 reads out a card ID recorded in the card 120, thereby authenticating or specifying the user as a card holder.

FIGS. 3A to 3D are schematic views for explaining a situation in which mail data is encrypted using S/MIME and transmitted by email and by an IFAX.

In this embodiment, when the MFP receives mail encrypted using S/MIME and transmitted to a plurality of destinations including a Bcc address, if there exist a plurality of certificates about recipients, the MFP prints only information of the certificate about the self apparatus and does not print information about other destinations. This explicitly indicates to the user of the MFP as a receiver that verification of the certificate has been normally performed while preventing information about the Bcc from being revealed.

A case in which email is broadcast from sales@xyz.co.jp of the MFP 106 to ifax@abc.co.jp of the MFP 100 as a To address and ccountant@xyz.co.jp of the MFP 107 as a Bcc address will be exemplified.

Figure 3:
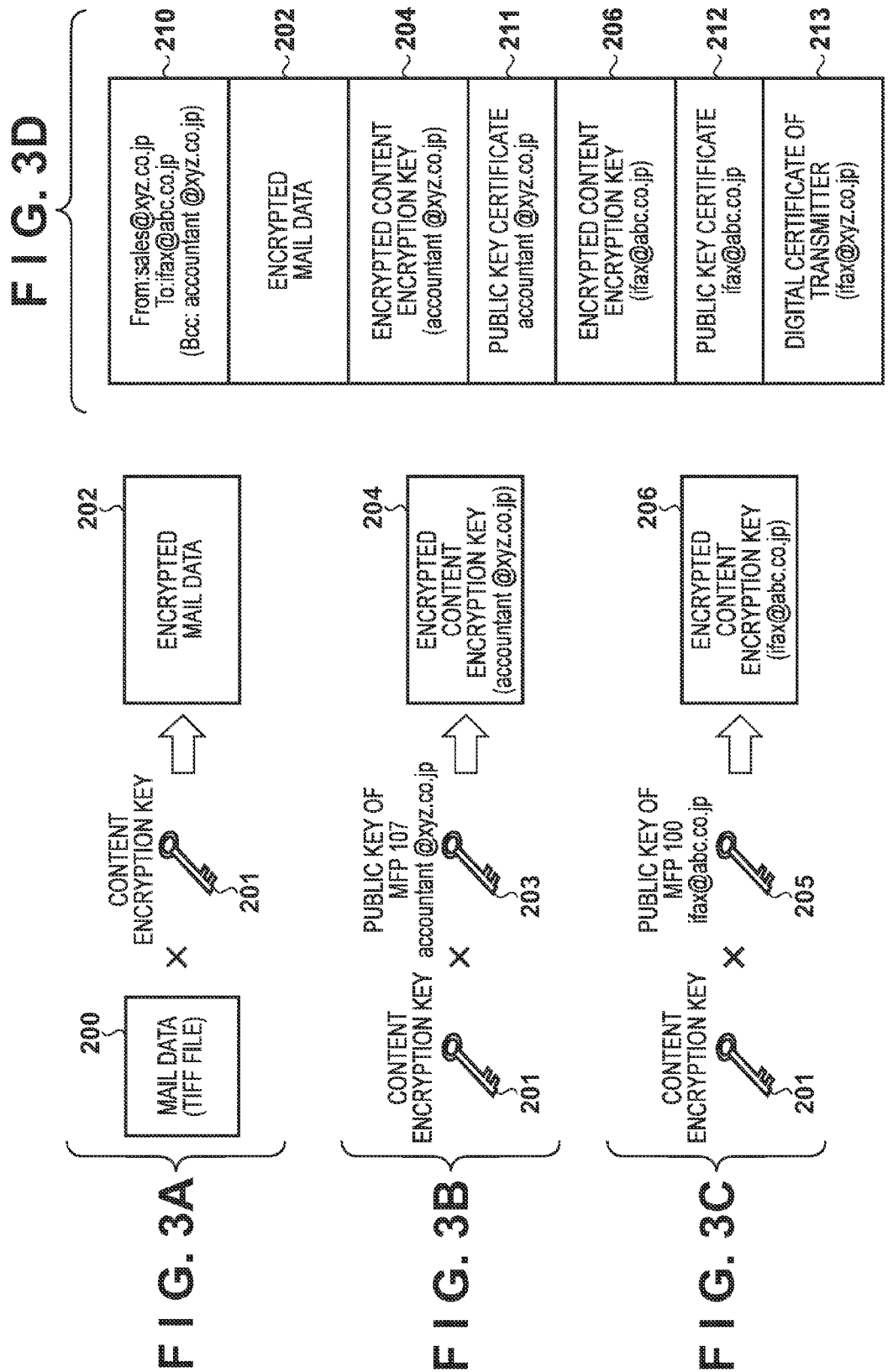
FIGS. 3A to 3D are schematic views for explaining a situation in which mail data is encrypted using S/MIME and transmitted by email and by an IFAX.

Referring to FIG. 3A, mail data 200 indicates email data before encryption, and is attached with an electronic file obtained by converting image data obtained by the scanner 134 of the MFP 106 into a TIFF file. A content encryption key 201 is a common encryption key (common key) which changes every transmission operation. The mail data 200 is encrypted by a common key cryptosystem using the content encryption key 201, thereby creating encrypted mail data 202.

Referring to FIG. 3B, the content encryption key 201 used for encryption is encrypted by the public key cryptosystem using a public key 203 of the MFP 107 as a preset transfer destination, thereby creating an encrypted content encryption key (encrypted common key) 204.

Referring to FIG. 3C, the content encryption key 201 used for encryption is encrypted by the public key cryptosystem using a public key 205 of the MFP 100 as a preset transmission destination, thereby creating an encrypted content encryption key (encrypted common key) 206.

FIG. 3D shows mail data transmitted from the MFP 106 as a transmission source.

In a mail header 210, the mail address (sales@xyz.co.jp) of the MFP 106 as a transmission source is set in a From field, and the mail address (ifax@abc.co.jp) of the MFP 100 as a transmission destination is set in a To field. The MFP 107 is set as the transmission destination of the Bcc but no Bcc field is shown here.

The encrypted mail data 202 is arranged below the mail header 210, and then the encrypted content encryption key (encrypted common key) 204 and a public key certificate 211 of the MFP 107 as the preset transfer destination are arranged. Then, the encrypted content encryption key (encrypted common key) 206 of the MFP 100 and a public key certificate 212 of the MFP 100 as the preset transmission destination are arranged. At last, a digital certificate 213 of the MFP 106 as a transmission source, in which a digest of the mail data and the like are described, is arranged. Note that a signature may be attached to encrypted mail or mail attached with a signature may be encrypted.

Figure 4:
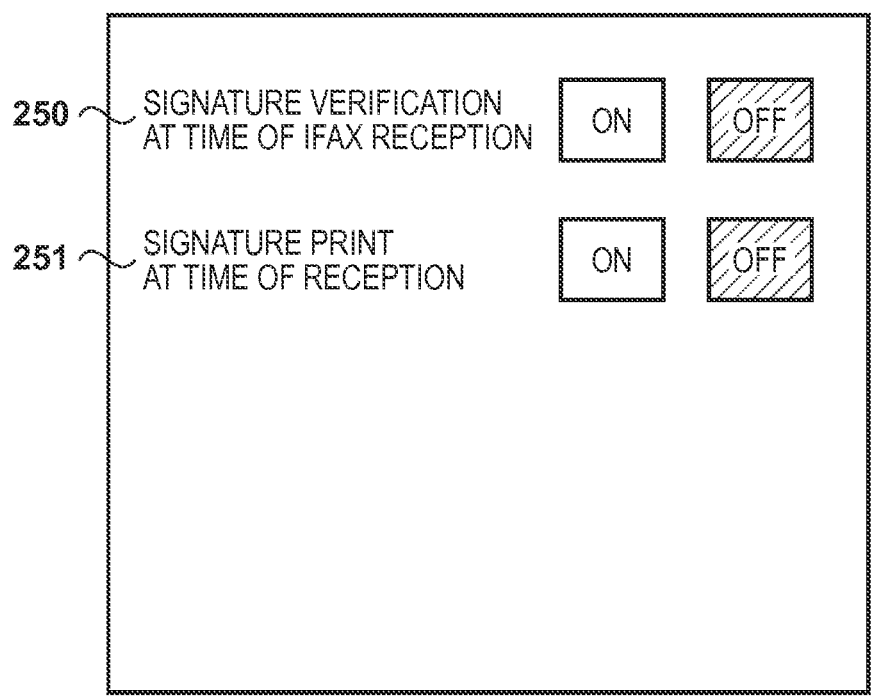
FIG. 4 is a view showing an example of a user mode setting screen in which the administrator of an MFP 100 or 107 as a receiver can make settings.

FIG. 4 is a view showing an example of a user mode setting screen in which the administrator of the MFP 100 or 107 as a receiver can make settings according to the embodiment.

"Signature verification at the time of IFAX reception" 250 is used to select whether to verify an attached certificate when mail attached with a signature is received, and ON and OFF switches are provided. The OFF switch (a certificate is not verified) is set by default. If, however, it is necessary to perform S/MIME communication to enhance the security, the ON switch is set.

"Signature print at the time of reception" 251 is used to select whether to print data of a signature when an effective signature is attached at the time of reception, and ON and OFF switches are provided. The OFF switch (data of a signature is not printed) is set by default. If, however, the mail is mail attached with a signature such as S/MIME mail and it is confirmed who is a sender and whether recipient information has been altered, the ON switch is set.

FIG. 5 is a view showing an example of the mail body image of the first page of the mail data shown in FIG. 3D, which has been encrypted using S/MIME and received and printed by the MFP 100.

The mail body image is rasterized into an A4 or LTR image. A mail header 300 is data obtained by picking up From, To, Subject, Data, and Message-Id fields from the data described in the mail header 210 shown in FIG. 3D. A mail body 301 indicates document data input by the user as a mail body via the operation unit 133 of the MFP 106 when transmitting the data from the MFP 106. Assume that in the MFP 100, the "signature verification at the time of IFAX reception" 250 and "signature print at the time of reception" 251, both of which are shown in FIG. 4, are set ON to enhance the security. The printed mail body includes a sender signature 302 and a recipient signature 303. Note that each of the signatures includes information about a vender name which has manufactured the MFP, a model name, and a serial number in addition to an issuer, and thus even a general user can readily understand the contents.

Figure 6:
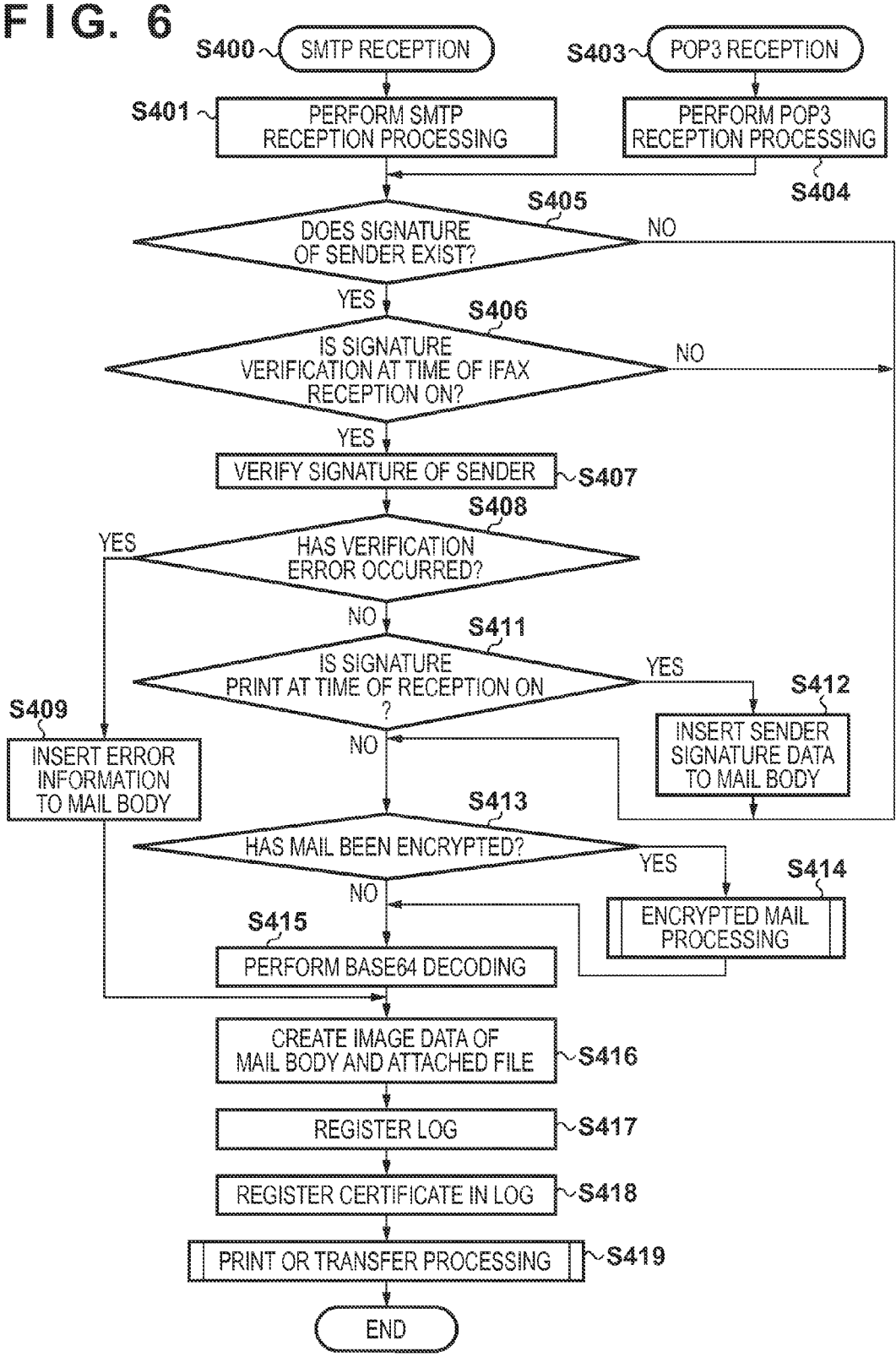
FIG. 6 is a flowchart illustrating processing when the MFP 100 or 107 receives the S/MIME mail shown in FIG. 3D.

FIG. 6 is a flowchart for explaining processing when the MFP 100 or 107 receives the S/MIME mail shown in FIG. 3D according to the embodiment. Note that a program for executing this processing is stored in the ROM 131. The processing indicated by the flowchart is implemented when the CPU 130 reads out and executes the program. Note that IFAX reception includes a reception operation by the SMTP protocol and a reception operation by the POP3 protocol. If a reception operation by the SMTP protocol starts, the process starts from step S400. If a reception operation by the POP3 protocol starts, the process starts from step S403.

In step S401, the CPU 130 executes reception by SMTP reception processing. Upon completion of reception, the process advances to step S405. Alternatively, if a reception operation by the POP3 protocol starts, the CPU 130 executes POP3 reception processing in step S404. Upon completion of reception, the process advances to step S405. In step S405, the CPU 130 determines whether the signature of the digital certificate 213 of the sender exists in the received mail. If the signature exists, the process advances to step S406, and the CPU 130 determines whether the "signature verification at the time of IFAX reception" 250 of the user mode setting shown in FIG. 4 has been set ON. If it is determined in step S406 that the "signature verification at the time of IFAX reception" 250 has not been set ON or it is determined in step S405 that no signature of the sender exists, the process advances to step S413.

If the CPU 130 determines in step S406 that the "signature verification at the time of IFAX reception" 250 has been set ON, the process advances to step S407, and the CPU 130 verifies the signature of the sender. In step S408, the CPU 130 determines whether a verification error has occurred. If the CPU 130 determines in step S408 that a verification error has occurred, the process advances to step S409, and the CPU 130 adds, to the mail body, information indicating that the signature verification error has occurred. The process then advances to step S416.

On the other hand, if the CPU 130 determines in step S408 that no verification error has occurred, the process advances to step S411, and the CPU 130 determines whether the "signature print at the time of reception" 251 of the user mode setting shown in FIG. 4 has been set ON. If the CPU 130 determines that the "signature print at the time of reception" 251 has been set ON (print), the process advances to step S412, and the CPU 130 extracts the sender signature 302, and inserts it to the mail body. The process then advances to step S413. Also, if it is determined in step S411 that the "signature print at the time of reception" 251 has not been set ON, the process advances to step S413. In step S413, the CPU 130 determines whether the mail has been encrypted. If the CPU 130 determines that the mail has been encrypted, the process advances to step S414, and the CPU 130 performs encrypted mail processing (to be described later with reference to FIG. 7) of decrypting the encrypted mail. The process then advances to step S415. Also, if the CPU 130 determines in step S413 that the mail has not been encrypted, the process advances to step S415.

In step S415, the CPU 130 performs base64 decoding for an attached file, thereby decoding the data of a mail format into an image file. The process advances to step S416, and the CPU 130 rasterizes the mail body text to convert it into image data for respective pages. The CPU 130 also separates the attached image file formed from a plurality of pages into image data for the respective pages, and stores them in the HDD 137 as document management data (to be described later with reference to FIG. 8). When the CPU 130 normally stores the document data as document management data in step S416 as described above, the process advances to step S417, and the CPU 130 registers a reception log. The process advances to step S418, and the CPU 130 registers, in a log, information of the digital certificate 213 of the transmitter included in the sender signature 302 and recipient signature 303 of FIG. 5 and the public key certificate 211 of the self apparatus. The user can instruct, via the operation unit 133, to display the log or print the log as a communication management report. Like the printed mail body image shown in FIG. 5, the user can confirm the log later. The process then advances to step S419, and the CPU 130 executes print or transfer processing (to be described later with reference to FIG. 10) of the mail body image, thereby terminating the process.

Figure 7:
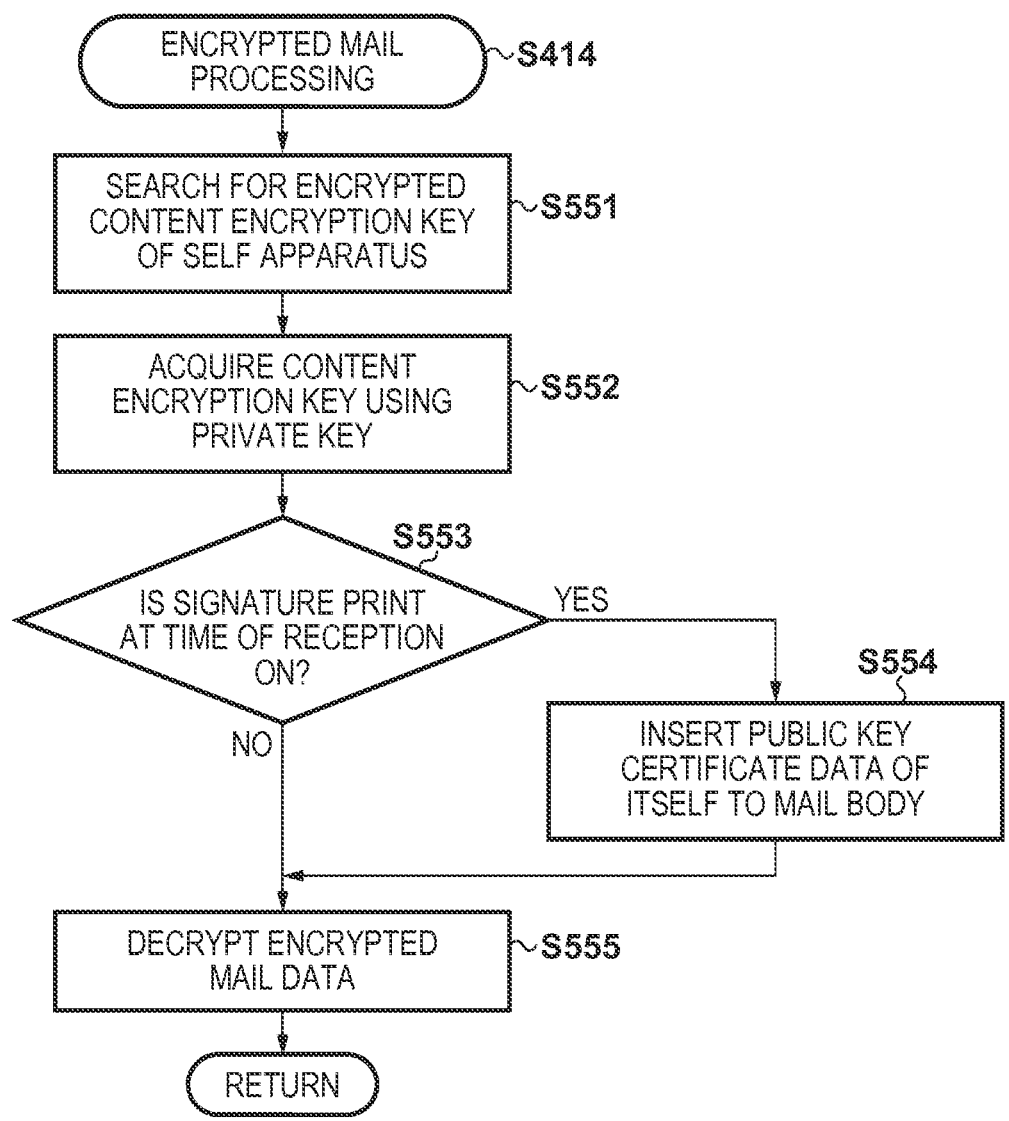
FIG. 7 is a flowchart illustrating encrypted mail processing in step S414.

FIG. 7 is a flowchart for explaining the encrypted mail processing in step S414 of FIG. 6.

If mail is broadcast, a plurality of encrypted content encryption keys exist in the mail, as shown in FIG. 3D. Therefore, in step S551, the CPU 130 searches for the encrypted content encryption key (206 in FIG. 3D) of the self apparatus. The process advances to step S552, and the CPU 130 decrypts the found encrypted content encryption key using the private key of itself to acquire the content encryption key 201, thereby decrypting the received encrypted mail using the content encryption key 201. The process advances to step S553, and the CPU 130 determines whether the "signature print at the time of reception" 251 of the user mode setting shown in FIG. 4 has been set ON. If the CPU 130 determines in step S553 that the "signature print at the time of reception" 251 has been set ON, the process advances to step S554 and the CPU 130 inserts the public key certificate data 303 of itself to the mail body. The process then advances to step S555. Alternatively, if the CPU 130 determines in step S553 that the "signature print at the time of reception" 251 has not been set ON, the process advances to step S555. In step S555, the CPU 130 decrypts the encrypted mail data using the acquired content encryption key 201 according to the common key cryptosystem, thereby terminating the process.

This processing enables the transmission destination MFP to acquire the content encryption key 201 destined to the self apparatus, and decrypt the encrypted mail data. If printing of the mail has been set, the MFP can insert the public key certificate data 303 of itself to the mail body, thereby executing printing.

FIG. 8 is a view for explaining the document management data managed by the MFP 100 according to the embodiment. Note that FIG. 8 shows one document data but a plurality of document data are actually managed.

In this example, image data for respective pages are managed to implement high-speed printing. Each image data is stored in an image region 610. Each image data is attached with attribute information 611 for each page. If a file related to the image data exists, it is stored in a related file 612.

In the example of FIG. 8, the MFP 106 transmits the mail body and scanned images of three pages according to an instruction input from the operation unit 133 of the MFP 106, and the MFP 100 receives the mail, and stores the received data in the document management unit of the HDD 137. In this example, the mail body is rasterized into an A4 image, as shown in FIG. 5, and TIFF image data of one page is stored as image data 600 of the mail body. The text data of the mail body is managed as text data 608 stored as the related file 612. As a result, the image data 600 of the mail body includes the TIFF image file and text file, and thus "TIFF-TEXT" 604 is recorded in the attribute information 611. Furthermore, scan image data are stored as scan image data 601 to 603 of respective pages and "TIFF" is recorded in the pieces of attribute information 611 of the scan image data of the respective pages, as denoted by reference numerals 605 to 607.

FIG. 9 is a view showing an example of a screen for making transfer settings, which is displayed on the operation unit 133 of the MFP 100 according to the embodiment.

Detailed settings can be input as transfer settings by pressing setting buttons 704. The transfer settings can be turned on/off by corresponding buttons 700. This ON/OFF setting can validate/invalidate the settings without erasing pieces of information of the transfer settings. The ON and OFF states of each button 700 are toggled every pressing operation. It is possible to assign a transfer condition name 701 to each transfer setting, and select a FAX or IFAX as a reception means 702. If the reception means 702 is a FAX, it is possible to decide a transfer destination according to a condition such as the telephone number or subaddress of the destination. If the reception means 702 is an IFAX, it is possible to decide a transfer destination according to the From address, To address, and Subject data of the email header. FAX, IFAX, email, or file transmission can be selected as a transfer destination 703. The transfer destination can also be selected from an address book, and it is also possible to designate a transfer operation simultaneously with printing. A default print button 705 is a toggle button used to set whether to print received data when the condition does not match any of the conditions of the transfer settings. It is possible to register up to 2,000 transfer settings. Information of the transfer settings can be scrolled on the screen using scroll buttons 706 and 707. An OK button 708 is a button used to instruct completion and confirmation of the settings on the screen.

As for these transfer settings, even if the condition matches one of the transfer conditions, the process does not end, and all transfer operations with matched transfer conditions are performed. In the MFP used by a plurality of users, it is difficult to check whether the condition matches the condition of a transfer setting made by another user. It is possible to input a plurality of transfer settings with no regard to a search order.

FIG. 10 is a flowchart for explaining the print or transfer processing in step S419 of FIG. 6.

In step S801, the CPU 130 determines whether an error has occurred in the reception processing. If the CPU 130 determines in step S801 that signature verification has failed as in step S408 of FIG. 6 or an error has occurred in encryption processing, the process advances to step S813 without performing a transfer operation to execute printing, thereby terminating the process. Consequently, it is possible to notify the user who is using a receiver that an error has occurred without transferring, to irrelevant destinations, document data or the like for which a reception error has occurred. Note that if it is determined in step S408 of FIG. 6 that a verification error has occurred, document data to be printed is only the mail header 300 of FIG. 5 and the error information added in step S409, and information of the remaining portion is not processed and is not thus printed.

If the CPU 130 determines in step S801 that no error has occurred, the process advances to step S802 to check whether the transfer destinations include an email destination. If no email destination exists, the process advances to step S804. If an email destination exists, the process advances to step S803, and the CPU 130 transmits the data to the email destination. The process then advances to step S804. When transmitting the data to the email destination, transmission of the text data of a creation source as a mail body decreases the data size and facilitates handling, as compared with transmission of image data created from text information. Therefore, when transmitting the data to the email destination, if the attribute information 611 of the document management data shown in FIG. 8 is "TIFF-TEXT", the text data 608 existing in the related file 612 is transmitted. The text data 608 will be described later with reference to FIG. 11. Also, since the pieces of attribute information 611 of the scan image data of the second page and subsequent pages are "TIFF", the sender transmits the mail attached with the image files (TIFF) 605 to 607 of the scan image data 601 to 603.

In step S804, the CPU 130 determines whether the transfer destinations include a FAX. If no FAX is included, the process advances to step S806; otherwise, the process advances to step S805 to perform transmission to the FAX destination, and then advances to step S806. Data to be transferred to the FAX destination is the TIFF image data shown in FIG. 8. An image which can undergo FAX transmission is only a TIFF image file. Therefore, if the attribute information 611 is "TIFF-TEXT", only a TIFF image file is selected. The image data 600 which is the same as the print image described in FIG. 5 is transmitted as the image data of the first page. The image files (TIFF) 605 to 607 of the scan image data 601 to 603 obtained by scanning by the transmission source MFP are transmitted as the image data of the second page and subsequent pages.

In step S806, the CPU 130 determines whether the transfer destinations include an IFAX. If no IFAX is included, the process advances to step S808; otherwise, the process advances to step S807 to perform transmission to the IFAX destination, and then advances to step S808. Like the FAX destination, a TIFF image file is selected and transmitted to the IFAX destination.

In step S808, the CPU 130 determines whether the transfer destinations include a file transmission destination. If no file transmission destination is included, the process advances to step S810. On the other hand, if it is determined in step S808 that a file transmission destination is included, the process advances to step S809 to transmit the data to the file transmission destination, and then advances to step S810. Like the FAX destination, the TIFF image data 600 is selected and transmitted to the file transmission destination. If, however, the attribute information 611 of the document management data is "TIFF-TEXT", both the image data 600 and the text data 608 may be transmitted.

The process advances to step S810, and the CPU 130 determines whether the transfer destinations include a BOX destination. If no BOX destination is included, the process advances to step S812; otherwise, the process advances to step S811. In step S811, the CPU 130 copies intact the data including the document management information which has been described with reference to FIG. 8, and the process advances to step S812. As a result, if the document data is transferred to the BOX, and then the document data is selected from the BOX and transmitted, it is possible to transmit an optimum file according to the setting of the transfer destination, as described above.

The process advances to step S812, and the CPU 130 determines whether it has been set to execute printing at the time of transfer or whether the default print button 705 used when the condition does not match any of the conditions of the transfer settings has been set ON. If the default print button 705 has not been set ON, the process ends; otherwise, the process advances to step S813 and the CPU 130 prints the received document data, thereby terminating the process.

Note that since the attribute information 611 of the document management data for the data to be printed as the first page is "TIFF-TEXT", the image data 600 is selected to print, for example, the image shown in FIG. 5 in step S813. Since the pieces of attribute information 611 for the second page and subsequent pages are "TIFF", the image files 605 to 607 of the scan image data 601 to 603 are printed.

FIG. 11 is a view showing an example of the text data of the mail body transmitted from the MFP 100 (ifax@abc.co.jp) to an email transfer destination (tanaka@abc.co.jp) according to the embodiment.

A mail header 850 is a new mail header to be added when the MFP 100 transfers the received data to the transfer destination (tanaka@abc.co.jp). Text data 851 is, for example, the text data 608 shown in FIG. 8, and is the text data of the received mail body, which has been used to create, for example, the image described with reference to FIG. 5. A case in which the MFP 106 sends a bill to the MFP 100 is shown.

The present invention is not limited to the aforementioned embodiment and various changes and modifications can be made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-060800, filed Mar. 24, 2014, which is hereby incorporated by reference herein in its entirety.

What is claimed is:
1. A multi-function device comprising:
a network interface;
a printer;
a memory that stores instructions;
a processor that executes the instructions to cause the multi-function device to:
receive, via the network interface, data including (i) email data which was encrypted by using a key, (ii) the key, which has been encrypted by using a public key of the multi-function device, and (iii) a public key certificate of the public key of the multi-function device;

decrypt the encrypted key by using a private key corresponding to the public key of the multi-function device;

decrypt the received email data by using the decrypted key;

create image data from text data indicating the decrypted email data and the public key certificate of the public key of the multi-function device; and control the printer to print, in one print process, the created image data representing the decrypted email data and the public key certificate of the public key of the multi-function device, wherein, in a case where the data received via the network interface further includes a second public key certificate of an other apparatus to which the data was sent, control is performed so that the second public key certificate of the other apparatus is not printed by the printer.

2. The apparatus according to claim 1, wherein the image data is created from text data indicating the decrypted email data, the public key certificate of the public key of the multi-function device, and a public key certificate of a public key of a sender, and wherein the printer prints the image data representing the decrypted email data, the public key certificate of the public key of the multi-function device, and the public key certificate of the public key of the sender.

3. The apparatus according to claim 1, wherein the email data is encrypted in accordance with S/MIME (Secure/Multipurpose Internet Mail Extensions).

4. The apparatus according to claim 1, wherein the instructions further cause the multi-function device to transfer, via the network interface, the decrypted email data and the public key certificate of the public key of the communicating apparatus.

5. The apparatus according to claim 1, wherein the instructions further cause the multi-function device to transfer, via the network interface, the decrypted email data and the public key certificate of the public key of the communicating apparatus as image data.

6. The apparatus according to claim 1, wherein the instructions further cause the multi-function device to transfer, via the network interface, the decrypted email data and the public key certificate of the public key of the multi-function device as image data and text data.

7. A control method for a multi-function device, the method comprising:

receiving, via a network interface, data including (i) email data which was encrypted by using a key, (ii) the key, which has been encrypted by using a public key of the multi-function device, and (iii) a public key certificate of the public key of the multi-function device;

decrypting the encrypted key by using a private key corresponding to the public key of the multi-function device;

decrypting the received email data by using the decrypted key;

creating image data from text data indicating the decrypted email data and the public key certificate of the public key of the multi-function device; and controlling a printer to print, in one print process, the created image data representing the decrypted email data and the public key certificate of the public key of the multi-function device, wherein, in a case where the data received via the network interface further includes a second public key certificate of an other apparatus to which the data was sent, control is performed so that the second public key certificate of the other apparatus is not printed by the printer.

8. A non-transitory computer-readable storage medium storing a program for causing a computer to execute each step of a control method for a multi-function device, the control method comprising:

receiving, via a network interface, data including (i) email data which was encrypted by using a key, (ii) the key, which has been encrypted by using a public key of the multi-function device, and (iii) a public key certificate of the public key of the multi-function device;

decrypting the encrypted key by using a private key corresponding to the public key of the multi-function device;

decrypting the received email data by using the decrypted key;

creating image data from text data indicating the decrypted email data and the public key certificate of the public key of the multi-function device; and controlling a printer to print, in one print process, the created image data representing the decrypted email data and the public key certificate of the public key of the multi-function device, wherein, in a case where the data received via the network interface further includes a second public key certificate of an other apparatus to which the data was sent, control is performed so that the second public key certificate of the other apparatus is not printed by the printer.

* * * * *